United States Patent [19]

Bickel et al.

[11] 4,360,248
[45] Nov. 23, 1982

[54] MULTIPORT OPTICAL COMMUNICATION SYSTEM AND OPTICAL STAR STRUCTURE THEREFOR

[75] Inventors: Gary W. Bickel; David L. Baldwin, both of Roanoke, Va.

[73] Assignee: International Telephone and Telegraph Corporation, New York, N.Y.

[21] Appl. No.: 233,754

[22] Filed: Feb. 12, 1981

Related U.S. Application Data

[63] Continuation of Ser. No. 31,264, Apr. 18, 1979, abandoned.

[51] Int. Cl.³ .............................................. G02B 5/172
[52] U.S. Cl. .............................. 350/96.16; 350/96.15; 156/158
[58] Field of Search ................. 350/96.15, 96.16, 320; 156/158

[56] References Cited

U.S. PATENT DOCUMENTS

| | | | |
|---|---|---|---|
| 3,825,319 | 7/1974 | Cook et al. ...................... | 350/96.15 |
| 3,933,455 | 1/1976 | Chown ............................. | 350/96.15 |
| 4,054,366 | 10/1977 | Barnoski et al. ................. | 350/96.15 |
| 4,083,625 | 4/1978 | Hudson ........................... | 350/96.15 |
| 4,087,156 | 5/1978 | Kao et al. ....................... | 350/96.15 |
| 4,136,929 | 1/1979 | Suzaki ............................ | 350/96.16 |

FOREIGN PATENT DOCUMENTS 2712054 10/1977 Fed. Rep. of Germany ... 350/96.16

OTHER PUBLICATIONS

K. Ogawa et al., "Multimode Fiber Coupler," *Applied Optics*, vol. 17, No. 13, Jul. 1978.
K. Ogawa, "Multimode Fiber Coupler–Theory and Experiment," *Optical Fiber Transmission II*, Williamsburg, Virginia, WB7-1, Feb. 1977.
Barnoski, "Fundamentals of Optical Fiber Communications," Academic Press Inc., New York 1976, pp. 210–213.

*Primary Examiner*—John D. Lee
*Assistant Examiner*—Frank Gonzalez
*Attorney, Agent, or Firm*—John T. O'Halloran; Robert E. Lee, Jr.

[57] ABSTRACT

A multiport optical cable or bus, composed of bundles of parallel fibers interconnected by an optical star structure, has a higher packing fraction and greater efficiency in the mixing and redistribution functions because the star's radiating arms have their individual cladding layers omitted or removed and because they are fused together to form the mixer section or a part of it. Where the numbers of input and output ports and arms are unequal, the unclad arms have their fused portions optically spliced or connected to form a composite mixer section. Several sections may be cascaded, using the same structural principles, to provide additional lower-level optical outputs for control or other purposes. The cladding function for the star structure is provided by separately encasing the radiating arms and mixer section or sections in a light-reflecting material. Preferably, this is a plastic potting compound having an optical index of refraction lower than those of the star arms or mixer portions. Alternatively, a metallic reflective coating may be applied. The invention has particular utility as applied to optical buses comprised of fibers of the plastic clad silica type.

8 Claims, 2 Drawing Figures

MULTIPORT OPTICAL COMMUNICATION SYSTEM AND OPTICAL STAR STRUCTURE THEREFOR

This is a continuation of application Ser. No. 31,264, filed Apr. 18, 1979, now abandoned.

BACKGROUND OF THE INVENTION

In optical-fiber communication systems having multiple input and output ports, it is often advantageous to use a common interconnect bus and to employ multiplexing of communication signals at the various ports. This bus may comprise a bundle of optical fibers in parallel, each with its own surrounding cladding. For example, the cladding may consist of a concentric layer of a glass or epoxy resin having a slightly lower index of refraction than the signal-carrying silica fiber, thereby to confine the light rays by total internal reflection, as is well known. Alternatively, in some cases the fiber may be metallized to reflect the light rays.

Numerous configurations are possible for interconnecting a plurality of input ports with a plurality of output ports which may be greater, smaller, or equal in number. For greater reliability, it is common practice to transmit the same optical signals in parallel over an incoming bundle of fibers; then to mix and redistribute the signals substantially equally to the various output ports. Some output ports may be further subdivided so that one optical fiber may provide a plurality of low-level outputs used, for example, for optical feedback to control optical sources.

One known means for mixing a plurality of incoming optical signals from an incoming bundle of fibers and for redistributing them to another outgoing bundle of fibers is the transmission-type star coupler. Briefly, in known forms, the incoming fibers, each with associated cladding, are closely bundled together and their ends are terminated in a transverse plane. The light rays are then passed through a common optical mixing section, one end of which abuts the fiber ends and may be fused to them. From the mixing section, the light rays from all incoming fibers are then redistributed to another outgoing fiber bundle which abuts the other end of the star coupler and which may be similarly fused to it. The mixing section normally has a cross-section at least equal to the largest bundle cross-section and has its own outer potting casing, e.g., of epoxy resin. The mixing section may also have internal means for collimating light rays passing through it.

One serious limitation on the efficiency of such known star couplers is their considerable loss due to the packing fraction which is the ratio of total active core area to total bundle area in a plane transverse to the axis of the bundle. The packing fraction is usually substantially less than unity due to two factors:

(1) a packing factor due to stacking round fibers in a square or hexagonal close-pack array; and
(2) a packing factor due to the relatively thick cladding layer around the core of each optical fiber Typical packing fractions for optical waveguide bundles are in the vicinity of 40%. Losses are usually greatest in bundles of single-mode optical fibers, as compared to multi-mode optical fibers, because their cladding is usually thicker. It has been proposed to increase the packing fraction by thinning down the fiber claddings within the bundle adjacent the mixing section, but in the past this has been at the expense of higher light attenuation and losses in optical transmission efficiency.

SUMMARY OF THE INVENTION

Our invention is directed to an improved optical communication system and star coupler therefor which has much higher efficiency in the mixing and redistribution functions because the packing fraction may be nearly unity without increased attenuation and light losses in the interconnected cable bundles. Briefly, this is accomplished in one embodiment by eliminating all cladding from end portions of individual fibers adjacent the star mixing section and fusing them together to form a homogeneous mixing section having a cross-section substantially equal to the sum of the areas of the individual active filaments entering the star. Alternatively, the ends of the conventionally-clad fibers may be individually fused to the ends of unclad fibers whose opposite ends are fused together to form the mixing section. The signal outputs from the mixing section may then be distributed substantially equally to the fibers in the output fiber bundle by a complementary arrangement of unclad filaments radiating out from the other end of the mixing section and fused to the ends of the clad fibers in the output bundle.

In order to minimize signal attenuation and light losses, the composite star structure, comprising the input filaments, the fused mixing section or sections and the output filaments, is separately clad, for example by being encased in a suitable potting compound that has a slightly-lower optical index of refraction than the active elements embedded therein. Alternatively, this cladding function may be achieved by applying a reflective coating, e.g. of silver, over these elements of the composite star structure, this coating in turn being protected against damage and abrasion by an outside plastic coating.

As will become apparent from the detailed description below, our improved optical bus system permits any number of input ports to be interconnected with any number of output ports, within reasonable size and space limitations; and several star sections may be cascaded for further lower-level optical signal distribution if desired.

Conventional fusion splices or optical connectors may be used to interconnect the various components of the star structure with the rest of the optical system. In its simplest version, where the number of input ports equals the number of output ports, fusion splices may be eliminated entirely, if desired, and the star structure may consist simply of a section of the cable bundle in which individual fiber claddings are stripped from the active filaments which are then fused longitudinally together to form the mixing section, this cable section being separately clad as a unit, as previously described.

Any types of optical transmission fibers may be utilized in our improved coupling system. They may, for example, comprise single-mode or multi-mode fibers with either stepped or graded cladding, or combinations thereof. The fused mixing section of the star may be formed of undoped silica fibers or it may be formed by fusing together fibers which are doped in conventional manner.

The star structures embodying our invention are completely bidirectional so that optical signals may be transmitted in either direction. Hence, the terms "input" fibers, bundles, or ports and the terms "output" fibers, bundles, or ports are used in this specification for con-

It should be understood that the drawings are largely diagrammatic and not to any particular scale. For example, in the interests of showing essential features of the invention clearly, bundles of optical fibers are shown as being fanned out in a common plane, whereas in an actual installation their configurations may be quite different. Potting/cladding elements are likewise indicated only in simplified form since construction details of such elements are well-known to the art and their detailed configurations are not critical in the practice of our invention.

DETAILED DESCRIPTION OF THE INVENTION

Figure 1:
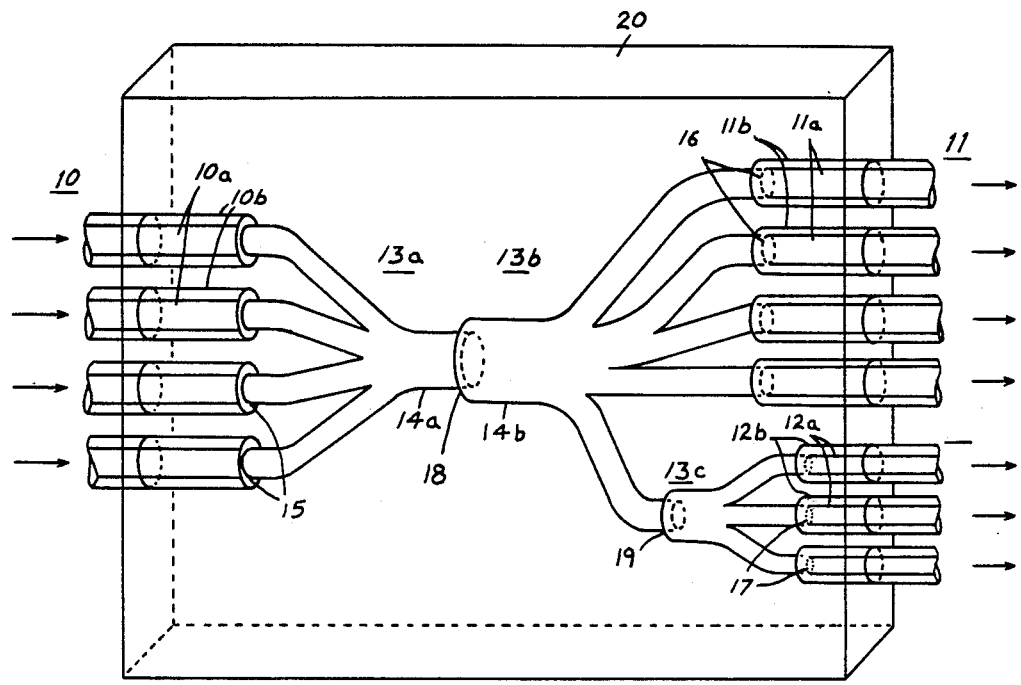
FIG. 1 is a simplified perspective view of a multiport optical distribution system embodying the invention having a differing plurality of input and output ports interconnected by several star coupler sections.

Referring first to FIG. 1 of the drawings, the illustrated multiport optical system comprises an input optical cable 10, represented as having four fiber elements, which is interconnected with a primary output optical cable 11, also having four optical fiber elements, and with a secondary output optical cable 12 having three fiber elements. Each of the fiber elements at the input ports is conventionally represented as having an optical fiber 10a surrounded by a concentric cladding 10b. Similarly, each of the fiber elements at the primary output ports comprises an optical fiber 11a with cladding 11b and each of the fiber elements at the secondary output ports comprises an optical fiber 12a with cladding 12b.

The optical star structure interconnecting the various input and output ports has three sections in the specific embodiment illustrated in FIG. 1, viz., a combining section 13a, a separating section 13b, and a further separating section 13c serially fed from one of the radiating arms of section 13b. Each section has as many radiating arms as necessary to interconnect it with its associated ports, these arms radiating out from the end of a common optical mixer portion. In FIG. 1, the respective mixer portions, sometimes called mixer rods, are shown at 14a, 14b, and 14c.

In FIG. 1, the radiating arms of the star sections are optically interconnected with their associated fibers by a plurality of fusion splices indicated at 15, 16, and 17 for the three fiber bundles. The adjacent ends of mixer portions 14a and 14b are similarly joined by a fusion splice at 18; and the lowermost arm radiating out from mixer portion 14b, as viewed in FIG. 1, is joined to the end of mixer portion 14c by a similar fusion splice at 19. Alternatively, optical connectors may be used in place of the fusion splices, though the latter take less space and minimize optical losses.

In accordance with our invention the optical star sections 13a, 13b, and 13c are formed from bare, unclad fibers, e.g., to pure silica or other suitable glass, that have their corresponding ends fused together to form their respective mixer portions 14a, 14b, and 14c. Since, in the illustrative embodiment of FIG. 1, the star section 13a has four arms while the star section 13b has five arms, the mixer portion 14b will have a larger cross-section than mixer section 14a to which it is spliced (indicated on a slightly exaggerated scale for clarity). Similarly, mixer portion 14c will have a larger cross-section than the single arm to which it is spliced at 19 because it is interconnected to three output fibers 12. These secondary outputs may be useful for low-power needs such as for optical feedback to control a plurality of optical sources.

In our improved star coupler structure, the previously mentioned packing fraction is very substantially increased because the stacking/packing factor, due to spaces between the round fibers in a conventional bundled array, is totally eliminated by fusing the fibers together and because the cladding/packing factor is also completely eliminated because the individual fiber arms in the star structure are unclad. Nevertheless, light attenuation losses, which conventionally are increased by removal of fiber cladding, are kept to a low value by encasing the entire star structure in its own potting/cladding compound. In FIG. 1, this is schematically represented by rectangular block 20 of a suitable plastic compound. It may of course have one of many physical configurations, depending on the fiber bundle arrangements, so long as its optical index of refraction is slightly lower than those of the light-carrying fibers encased within it. Alternatively, as previously indicated, the fiber arms and mixing portions of the star elements may be silvered or otherwise coated with a reflecting metal film which may in turn be covered with a protective plastic coating or potted for mechanical protection and support.

Even higher light-transmission efficiencies through the star coupler sections can be achieved where it is feasible to eliminate the fusion splices 15, 16, and 17, or some of them. For example, in the embodiment of FIG. 1, it may be feasible simply to strip the cladding off end sections of the fiber bundles and to fuse them together directly to form the star mixing portions 14a, 14b, and 14c. This is relatively simple when plastic clad silica (PCS) fibers are used; more difficult when the fibers have a glass cladding that requires etching for removal. In either case, the star section 13b would require addition of an unclad fiber to the fused bundle 14b so as to provide the additional arm that is in turn fused to mixing portion 14c at the splice 19.

As previously indicated, the system is bidirectional. Our improved star structure can be used to provide either or both of the combining and separating functions. The optical through-put is highest when the number of output ports is equal to or greater than the number of input ports. Any number of inputs or outputs from one to hundreds could conceivably be accommodated. The amount of optical power leaving each port depends on the size of its fiber, and possibly on its position in an array. With only a small number of output ports, as illustrated in FIG. 1, the optical power can be made about the same in each port that is interconnected with a common mixing section even if the mixing section is relatively short.

Figure 2:
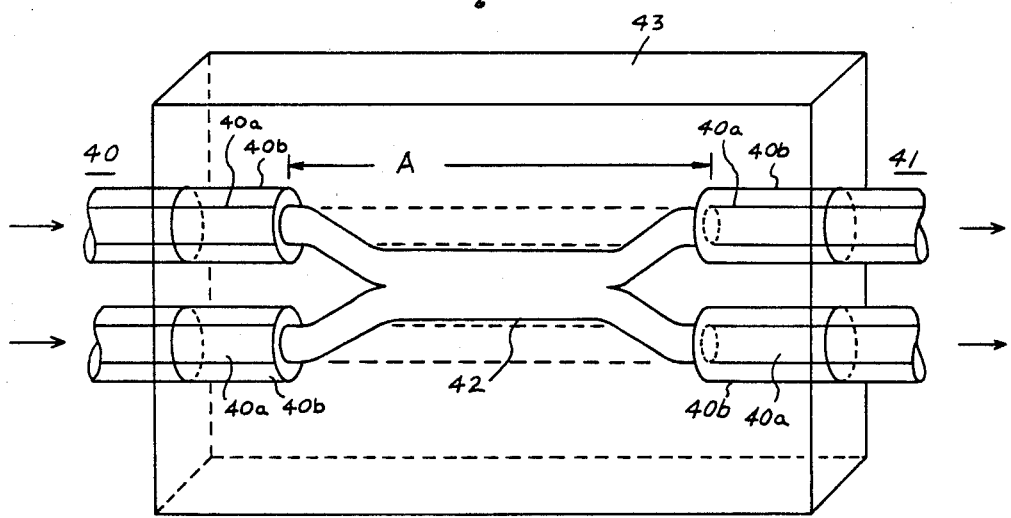
FIG. 2 is a similar perspective view, considerably simplified, of a less-complex optical distribution system embodying the invention which has only two input ports and two output ports with a unitary star coupler section interconnecting them.

FIG. 2 illustrates how the system structure can be considerably simplified if the numbers of input ports and output ports are equal. It is illustrated in its simplest form with only two input ports 40 and two output ports 41. The fibers 40a are provided with concentric cladding 40b, the latter being preferably, though not necessarily, of the plastic type. In order to form the structure of FIG. 2, the two fiber elements 40a, 40b are arranged parallel to each other and their claddings are stripped off over a length slightly greater than the dimension A. They are then pinched together and fused to form the star mixing structure 42 with its two combining arms on the left and separation arms on the right, as shown. These are then encased in the potting/cladding compound 43, as previously described, which is again represented in schematic rectangular block form to simplify the drawing.

In the simplified structure of FIG. 2, where the numbers of input and output arms are equal, all butt joints or fusion splices in the optical communication channels are completely eliminated, with consequent further increase in transmission efficiency. However, as previously pointed out, even in the general case our system structure provides substantially higher packing fractions in the fiber bundles without substantial cladding losses.

Our invention can be used in any of the following types of optical fiber systems:
(1) Any optical transmission systems requiring channels to be combined or separated, or both;
(2) Data bus types of communication systems; and
(3) High-reliability systems requiring redundant optical fibers and/or electro-optic elements.

While our invention has been disclosed in preferred embodiments, it will of course be apparent to those skilled in the art that other modifications may be made within the scope of our invention. For example, these structural principles may be applied to optical systems incorporating one or more reflection-type optical stars, in which all incoming optical signals are mixed and reflected back through the same bundle of coupling arms by means of a transverse planar reflecting surface at the end of the mixing section.

We claim:

1. A star coupler for an optical communication system which includes an optical bundle having a plurality of light-transmitting fibers each having a core and a cladding comprising in combination:
   means for balancing optical power among said plurality of fibers comprising a length of said fibers wherein said cladding has been removed and said cores have been fused together to form a homogeneous mixing section having a cross-section substantially equal to the sum of the areas of the unclad fibers, and
   a common cladding means positioned around said means for balancing.

2. The combination of claim 1 wherein:
   said common cladding means comprises a plastic compound which is in contact with all fiber surfaces throughout said coupler and which has a lower optical index of refraction.

3. The combination of claim 2 wherein:
   said star coupler is of the transmission type having said fibers both entering and leaving said mixing section.

4. The combination of claim 1, 2 or 3 wherein:
   said light-transmitting fibers are of the plastic clad silica type.

5. A method of forming a star coupler in a fiber optic communication system having an optical bundle of light-transmitting fibers, each of the fibers having a core and a cladding, comprising:
   removing said cladding from a length of each of said fibers,
   fusing said fibers together along the length having the cladding removed to form a homogeneous mixing section having a cross-section substantially equal to the sum of the areas of the unclad fibers,
   providing a common cladding around said fused length of said fibers for substantially reducing light losses.

6. A method of forming a star coupler in a fiber optic communication system having an input and an output optical bundle of light-transmitting fibers, each of the fibers having a core and a cladding comprising:
   removing a length of said cladding from the ends of each of said input fibers,
   fusing said ends together along said lengths to form a homogeneous mixing section having a cross-section substantially equal to the sum of the areas of the unclad fibers,
   removing said cladding from said output fibers,
   fusing said ends together along adjacent portions of their lengths to form a homogeneous mixing section having a cross-section substantially equal to the sum of the areas of the unclad fibers,
   abutting said fused ends of said input bundle to said fused ends of said output bundle, and
   fusing said abutted ends.

7. The method of claim 5 or 6 wherein said common cladding means comprises a plastic compound which is in contact with all fiber surfaces throughout said coupler and which has a lower optical index of refraction.

8. The method of claim 5 or 6 wherein said light transmitting fibers are of the plastic clad silica type.

* * * * *